United States Patent Office 2,722,084
Patented Nov. 1, 1955

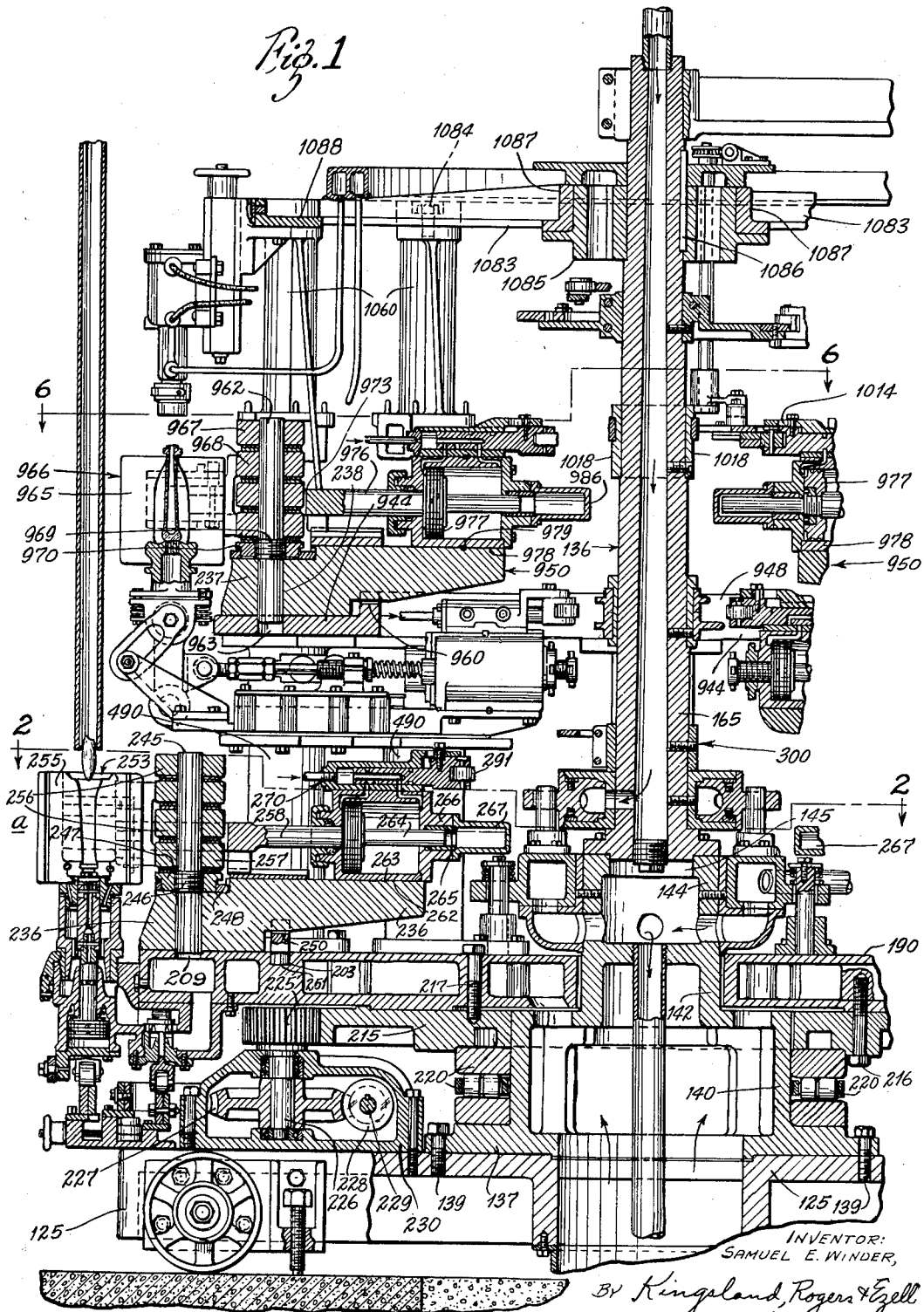

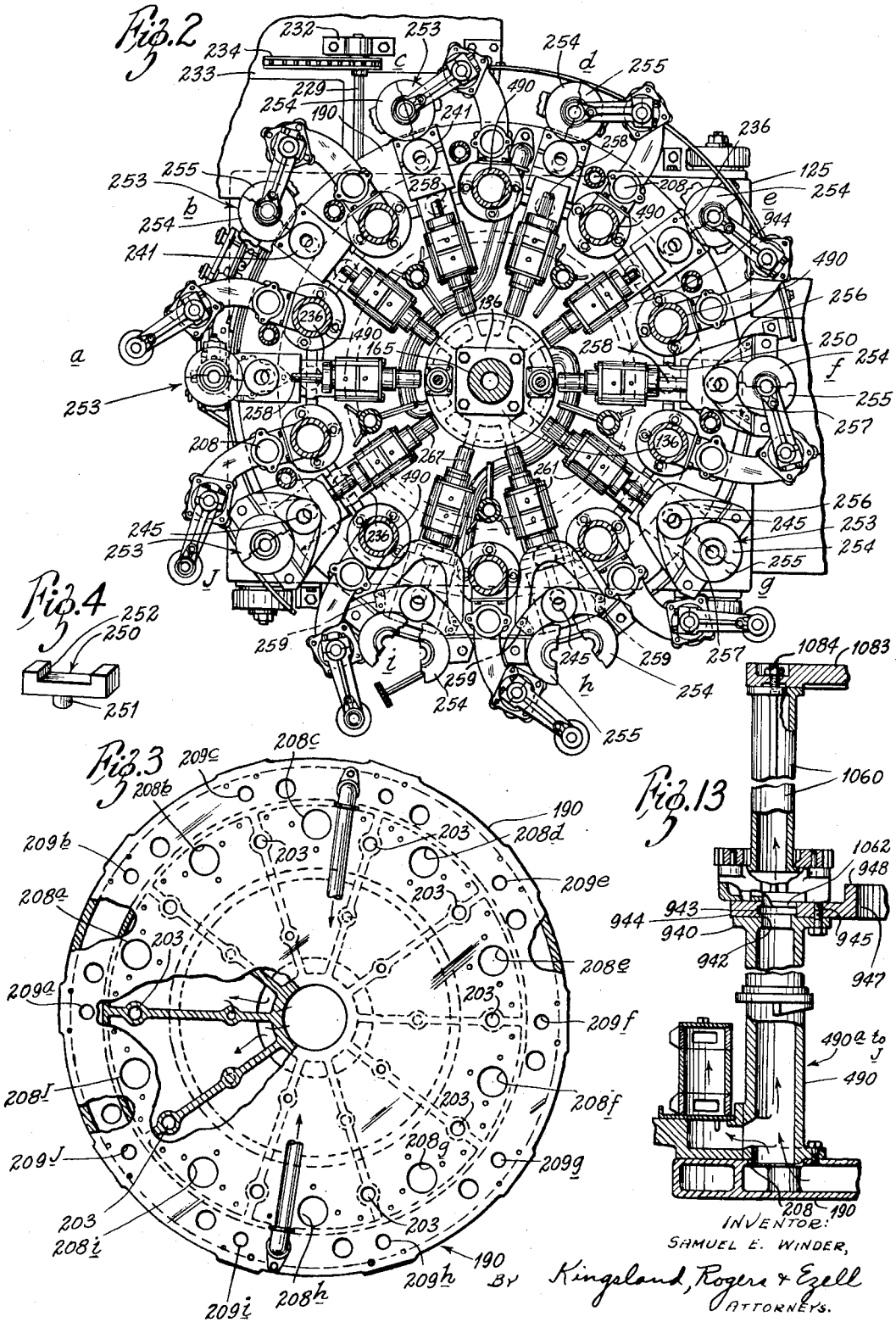

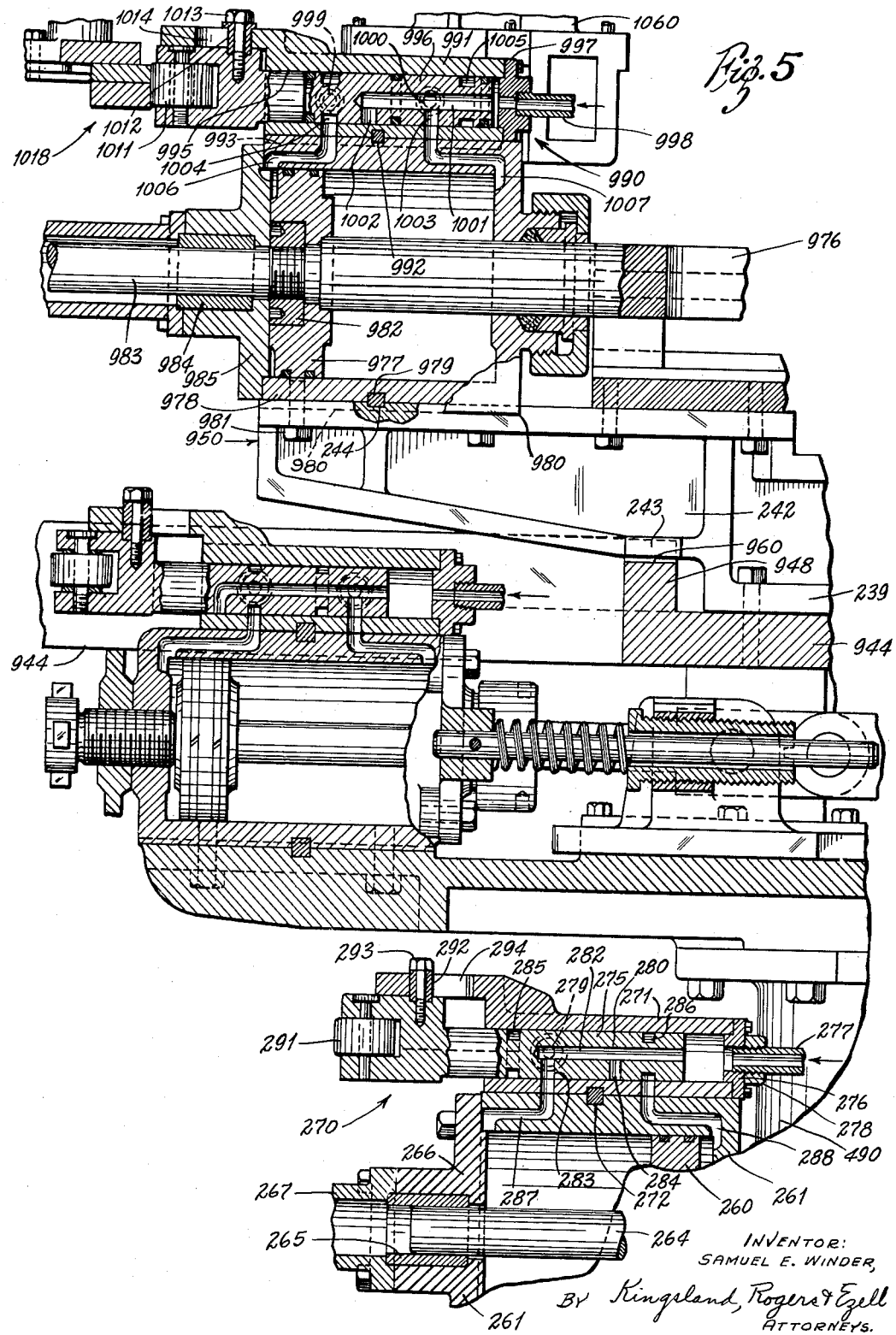

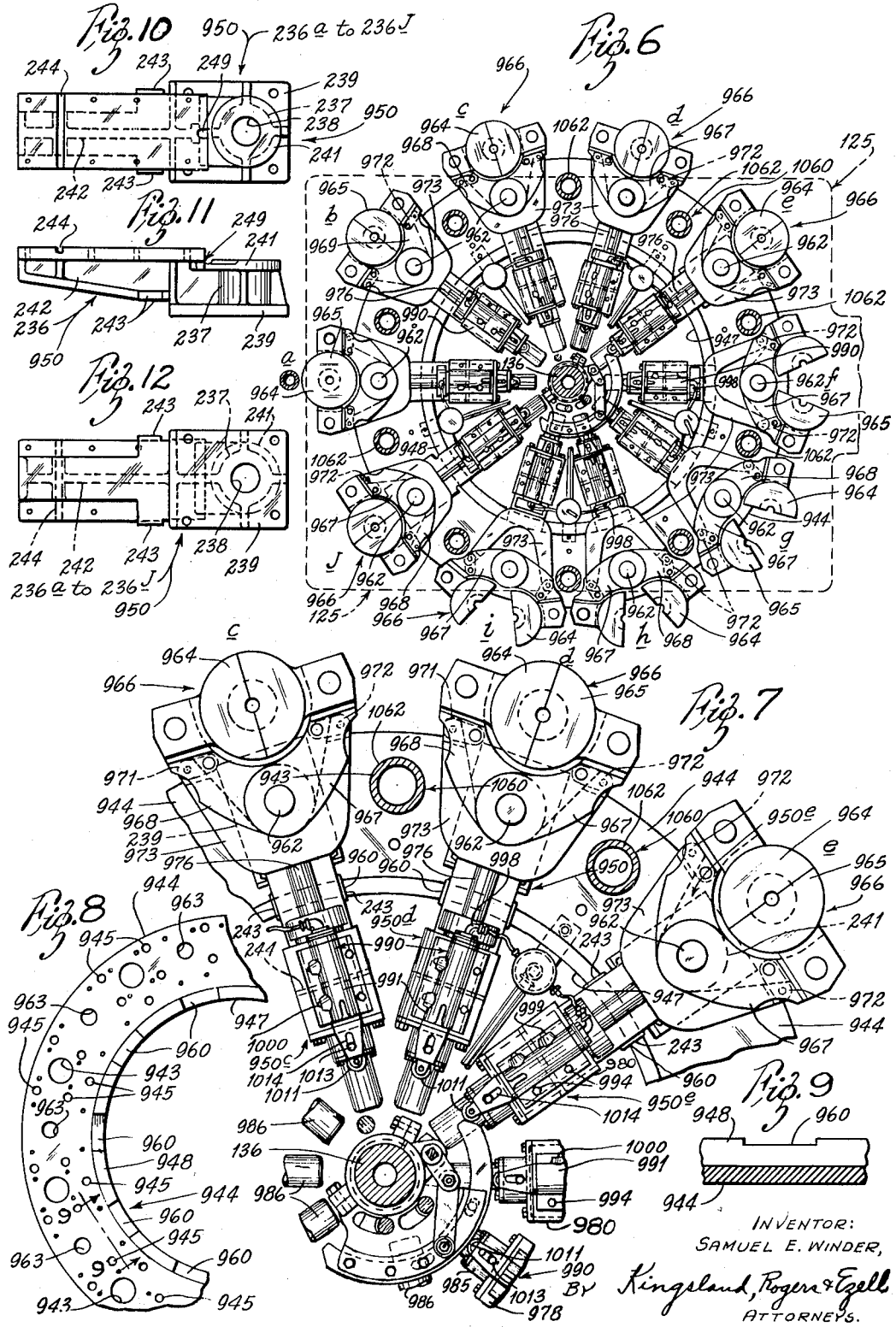

2,722,084

MOLD MECHANISMS FOR GLASS MACHINES

Samuel E. Winder, West Medway, Mass., assignor of one-half to Henry C. Daubenspeck, Massillon, Ohio Original application August 5, 1946, Serial No. 688,470. Divided and this application November 19, 1951, Serial No. 257,022

8 Claims. (Cl. 49—9)

The present invention relates generally to a bottle forming machine. In this connection, the manufacture of bottles is the primary concern of the invention. However, the subject matter of the present invention was originally disclosed in applicant's copending parent application, Serial No. 688,470, filed August 5, 1946, and the present disclosure, being divided therefrom, relates particularly to mold mechanisms for a bottle forming machine. It is the prime object of this invention to provide a machine by which glass products as mentioned above may be made more rapidly. It is a further prime object of the invention to provide a machine by which better quality glass products may be made with fewer rejects.

In the accomplishment of the above stated objects, it is a particular object of the invention to provide a continuous machine having two sets of molds thereon, both sets continuously rotating together, and adapted to participate in a desired cycle of operation as clearly described in the aforementioned parent application.

A further object of the invention is to provide a machine of this kind wherein there is a base with a framework rotatably mounted thereon, which rotatable framework constitutes the support for the two sets of molds and parts associated therewith.

A further object of the invention is to provide a machine of this kind having a minimum of separately designed parts and a maximum of interchangeable parts. A particular object is to have mold units that are readily removable as units, and that are interchangeable. Specifically, in this connection, it is an object of the invention to provide blank molds and finish molds with interchangeable mounting parts, interchangeable power operating parts, and interchangeable valve controlling parts. A further object of the invention is to provide quickly operating aligning means for insuring the proper relative disposition of the several parts, together with securing means by which the parts may be attached together.

A further object of the invention is to provide a machine of this kind wherein alterations and changes necessary to the production of different sizes and shapes of ware may quickly and easily be made.

A general object of the invention is to provide the foregoing features in a single composite machine requiring a minimum of floor area. A further object of the invention is to provide such a compact machine, in which parts requiring lubrication are accessible at any time.

In the drawings:

Figure 1 is a fragmentary diametrical vertical sectional view of a bottle forming machine embodying the present invention, some of the flexible tubing for the various valves and certain portions of mechanism in the background being omitted in the interest of clarity;

Figure 2 is a horizontal section illustrating the blank mold mechanism, the plane of the section being approximately indicated by the line 2—2 in Figure 1;

Figure 3 is a plan view of the revolving table of the machine with portions of the top wall thereof broken away;

Figure 4 is an isometric view of one of the blank cylinder centering brackets;

Figure 5 is an enlarged fragmentary vertical sectional view showing the finish mold, the transfer operating means, and part of the blank mold operating means;

Figure 6 is a horizontal sectional view through the machine taken above the blow mold level, approximately on the line 6—6 of Figure 1;

Figure 7 is a reproduction on an enlarged scale of a portion of Figure 6;

Figure 8 is a fragmentary plan view of the blow mold hanger base ring;

Figure 9 is a vertical sectional view on the line 9—9 in Figure 8, illustrating one of a series of ten equally spaced notches formed in said base ring;

Figures 10, 11 and 12 are, respectively, a detail plan view, a side elevational view, and a bottom plan view of a mold hinge pin and cylinder bracket; and Figure 13 is a fragmentary vertical sectional view, partly in elevation, of one of the blow mold hanger base ring supporting columns in position on the revolving table, in aligned relation with one of the extension columns for the blow molds.

As is clear from the foregoing statements of objects ultimately to be fulfilled by the present invention, the teachings thereof find useful application in the design and construction of glass machines, and particularly of bottle forming machines. The bottle forming machine depicted in the drawings, and particularly Figure 1 thereof, exemplifies a relatively intricate combination of interrelated cooperative elements which, as will appear, includes one specific embodiment of the subject matter of the present invention.

In view of the divisional status of this application as above mentioned and inasmuch as a complete detailed description of the depicted apparatus is contained in applicant's copending parent application Serial No. 688,470, filed August 5, 1946, the following description is largely restricted to those elements of structure which have functional responsibility pertinent to the hereinafter claimed invention.

The depicted machine includes a horizontal base 125, which supports a composite central column, generally designated 136, about which operating parts revolve. This column includes a round bottom part 137, having a bottom flange through which screws 139 pass to secure the column to the base 125. The lower column part 137 has a lower cylindrical portion 140 extending upwardly and surmounted by successively smaller cylindrical portions 142 and 144, the latter being flanged inwardly at the top and having a top opening 145.

From the top of the portion 144, there extends the upper column part 165. This column is flanged at its bottom and is provided with a circular projection that fits into the aforementioned opening 145 and insures location of the parts. It is held onto the lower column member 137 by screws, as shown in the drawings.

Near the bottom of the machine, there is a revolving table 190, shown in plan view in Figure 3. This revolving table has no less than three concentric circular series of holes extended down from the upper surface. One of these series comprises holes 203 disposed in equally spaced array about the center of the table 190. Another series comprises holes 208, generally interspaced between the holes 203. The third series comprises an outer circle of holes 209, each of the latter being in radial alignment with a respective hole 203. The holes 203 and 209 are accurately sized and spaced around the table, and constitute means for aligning molds on the table 190, as will appear. (As there are ten mold sets on the illustrated machine, all identical, the reference numbers will be applicable to the corresponding part of any one set. At times, the several sets and their component parts will be distinguished by the suffix characters *a* through *j*, the *a* set being at the 9 o'clock or charging position in the drawings.)

The table 190 is supported on a gear 215 attached to its lower surface. This gear is provided with an open center, so that it may fit over the lower section 140 of the lower column member 137. A plurality of screws 216 extend upwardly through the gear 215 and engage the table 190. Also, screws 217 extend downwardly from the top of the table and engage the gear 215. The gear, as appears in Figure 1, has an annular ridge on its upper surface that interfits with a smaller ridge on the lower surface of the rotating table, so that the parts hold together securely and in proper relationship.

The gear 215 is supported upon a roller bearing, generally indicated at 220, the same including conventional bearing races and rollers of annular shape that fit around the outside of the cylindrical portion 140 of the lower column member 137 and support the table and associated parts on the extending flange of the column member 137, which, in turn, rests upon the base 125. The bearing 220 provides for proper centering of the parts as well as for reducing the friction while the table, and the parts it supports, rotate.

The gear 215 is adapted to be engaged by a driving gear 225 (Figure 1) that is supported upon a vertical shaft 226, upon which is mounted another gear 227 driven by a worm wheel 228 on a driving shaft 229. The shaft 226, the gear 225, and the portion of the shaft 229 through the worm 228 are enclosed in and supported in a housing 230 that is held by screws to the base member 125. A suitable drive (not shown) may be provided for the shaft 229. It will be seen that, when the shaft 229 is rotated, power will be transmitted through the gears 227, 225 and 215 to cause the table 190 to rotate about the column 136.

It will be seen that, when the shaft 229 is rotated, power will be transmitted through the gears 227, 225 and 215 to cause the table 190 to rotate about the column.

The illustrated machine has ten blank or parison molds. Each blank mold unit is mounted on a block 236. The series of these blocks are designated 236a through 236j. The blocks are shown separately in Figures 10–12. Each has an outer section providing a vertical sleeve 237 with an opening 238. This outer section has a bottom flange 239 by means of which screws may attach the same to the rotating table 190. The top 241 of the sleeve receives adjustable hinge collars, as will appear. The block projects backwardly, with an overhang 242. The overhanging part is accurately finished on side and bottom at 243, to be received in a positioning block or yoke, as will appear. The overhang has a transverse key slot 244 across its upper surface.

Each hole 238 receives a mold hinge pin 245 with a press fit. The pin 245 has an enlarged intermediate threaded portion 246 which is brought down against the block 236. In this position, its bottom end is engageable in the hole 209 to aid in alignment of the mold on the table. A threaded collar 247 engages over the threads 246, and, in turn, receives a clamp 248. This clamp 248 is a split ring that may be drawn tightly about the collar 247. It has an ear adapted to engage in a notch 249 in the block 236, to clamp the attached parts against rotation. The collar 247 is adjustable, while the clamp is loose, to regulate the height of the mold. After proper adjustment is made, the clamp ring 248 is tightened.

A yoke 250 has a bottom pin 251 engageable in a hole 203, and an upper cradle 252 to accurately receive and locate the finished surfaces 243 of the block 236. (See Figure 4.) The yokes combine with the hinge pins to give complete, accurate fitting of the parts together in a simple way. After they are thus fitted, the screws securing the block 236 to the table 190 are tightened.

Each parison mold, of which there are ten in this machine, is generally designated at 253, and includes a pair of mold halves 254 and 255. The mold section 254 has arms that provide spaced hinge collars 256, while the other mold section 255 is provided with spaced hinge ears 257. As shown in Figure 1, the several ears 256 and 257 are interspaced over the hinge pin 245.

The two mold halves 253 and 254 thus may swing about the pin 245 to open or to close. The operation of the molds to open or closing position is obtained by a yoke member 258. This yoke 258 has opposed arms that engage the respective mold halves through suitable links 259.

The shank of the yoke member 258 constitutes a piston rod having, at its inner end, a piston 260. This piston is contained within a cylinder 261 that is supported on the top of the mold block 236 and is positioned thereon by a key 262 that interengages with the groove 244 of the block 236 and a related groove 263 in the bottom of the cylinder. This provides radially accurate positioning of the cylinders on the block. Lateral positioning is obtained by depending flanges on the sides of the cylinder casting that depend over the sides of the blocks 236. These flanges are not shown for these cylinders, but will appear in the description of similar cylinders. The cylinders are finally secured in position by screws.

The piston rod has an extension 264 thereon that is journaled in a bushing 265 contained within a head 266 that closes the end of the cylinder 261. A cap 267 is provided over the end of the head 266 to hold the journal 265 in place and yet to permit its replacement (Figure 5).

The piston 260 is operated by air that is supplied to its opposite ends under the control of a slide valve, generally indicated 270, that operates within a valve housing 271. There is one valve housing 271 secured to the top of each of the cylinders 260, and, therefore, there is one such valve housing for each set of parison molds.

Each valve housing 271 is located in endwise accuracy on the cylinder by a plug 272 engaged in grooves in the top of the cylinder 261 and the bottom of the valve housing 271. Each valve housing is flanged at its sides, to depend over the side edges of the top of the cylinder, and thereby to secure proper lateral location of the valve off the cylinder. The valve housing is finally secured to the cylinder by screws, as will appear in connection with other like valves in the machine.

The valve housing 271 has a cylindrical bore therethrough, in which a valve plug 275 slides. This bore is closed at one end by a head 276 that is held in place by screws. This head receives an air inlet line 277 that is threaded thereinto and secured by a lock nut 278. The air is thereby delivered to the cylindrical housing 271 at one end of the plug 275.

The cylinder is provided with two exhaust ports 279 and 280 that are shown in dotted lines in Figure 5. As these extend forwardly from the plane of the sheet in that drawing, they will appear more clearly in connection with identical valve parts used with certain other parts of the machine.

The valve plug 275 contains an axial bore 282 that opens toward the inlet line 277, and, at its inner end, registers with a radial port 283. It has also another transverse radial port 284. In addition to these ports, the valve plug has two peripheral exhaust grooves 285 and 286.

The valve housing 271 and the cylinder 261 have registering openings that provide air passages 287 and 288 that lead into the opposite ends of the cylinder 261.

The valve plug 275 projects from the end of the housing 271 and carries, at its outer end, a cam roller 291, in the manner shown. It also has a guide roller 292 held thereon by a screw 293, this roller reciprocating within a slot 294 in an arm projecting from the top side of the housing 271. This roller prevents rotation of the valve parts, and limits the linear movement of the plug.

In Figure 5, the valve is shown as actuated to a left-hand position toward the central column, under the influence of the air acting against the right-hand end of the plug 275. This air has moved the plug 275 as far to the left as it can go, until the roller 292 has reached the extreme end of the slot 294. In such position, the air has flowed through the passage 282 and the passage 283 to the passage 287, where it has acted against the left-hand end of the piston 260. In the meanwhile, the foregoing position of the valve has disposed the exhaust groove 286 in registry with the passage 288 from the right-hand end of the cylinder, so that the air contained on the opposite side of the piston 260 is exhausted out the exhaust port 280.

Subsequently, the cam roller 291 will come in contact with its cam track and the valve will be forced in the opposite direction to the right against the pressure of the air entering the inlet line 277. When this happens, the port 283 will be displaced from the passage 287, but the air port 284 will be brought into registry with the other passage 288 leading to the right end of the piston. The peripheral exhaust groove 286 will be removed from registry with its exhaust port 280, and the peripheral groove 285 will be brought into registry with the exhaust passage 279 and the passage 287. As a result of the foregoing, the air entering the air line will then pass through the passage 282 in the valve, the passage 284, and the passage 288 to the right-hand end of the piston 260, forcing the same to the left. The air on the opposite face of the piston will exhaust through the passage 287, the peripheral groove 285, and the exhaust port 279.

In the machine shown, there are ten mold sets, and hence ten valves 270. The various valves 270 are sequentially operated by being rotated to bring their cam rollers 291 against a cam arrangement that is mounted on the central column 136. This cam arrangement is indicated generally as 300 in Figure 1, and is shown and described in detail in applicant's aforementioned parent application.

Arranged around the rotating table 190 are a plurality of columns 490 (Figures 2 and 13) that interfit with the openings 208 in the top of the rotating table 190. These columns are held to the table by suitable screws.

Each of the columns 490 has an upper ledge 940 provided with a vertical circular flange 942. The several flanges 942 are adapted to interfit with openings 943 around a blow mold hanger base ring 944 (Figures 6 and 8). The foregoing obtains accurate location of the blow mold ring 944, as the columns 490 are already similarly engaged in the openings 208 in the table 190, which openings are accurate in size and position. A plurality of screw holes 945 may receive screws to hold these parts 944 and 490 together.

The ring 944 has a central opening 947 therein, this opening having a flange 948 standing upwardly therefrom. As there are ten of the columns 490, spaced equally around the rotating table 190, the blow mold hanger ring 944 is supported at ten points around its periphery. There are ten blow molds, corresponding to the ten blank molds. The ring rotates with the rotation of the table 190.

As shown in Figure 1, the supporting ring 944 is adapted to receive mold hinge pins and cylinder blocks 950 that are identical with the similar blocks 236 for the blank molds. They are shown in detail in Figures 10–12. The earlier description of these blocks 236 renders repetition here unnecessary.

The finished portions 243 of the blocks 950 interfit with notches 960 spaced around the flange 948 of the base ring. The notches 960, shown particularly in Figures 8 and 9, are sized and positioned properly to receive the finished positioning parts 243 of the blocks 950 and to position these parts against lateral movement. Additionally, as in the blank molds, each block receives a mold hinge pin 962 in an opening 238 in the block 950, that fits with a hole 963 in the ring 944, that is the same as the interfit of the blank mold hinge pin 244 in the hole 209 in the rotating table 190. The pin 962 and the notch 960 provide complete and accurate positioning for the blocks 950 around the support ring.

The ring is the support for the blow mold sections 964 and 965, the blow mold generally being designated at 966. The blow mold section 964 is provided with hinge ears 967 that interfit with hinge ears 968 of the mold section 965, to support these mold halves on the pin or spindle 962. The pin 962 is threaded for a space at 969, and is pressed into the hole 238 down to the threads. About this threaded portion, there is a collar arrangement 970, corresponding to the collar 247 on the blank mold section, and by which the mold sections may be adjusted vertically and secured in adjusted position.

The two mold halves 964 and 965 are connected by links 971 and 972, respectively, to a yoke 973. This yoke is formed integrally with the end of a piston rod 976, to which a piston 977 is secured.

The piston reciprocates in a cylinder 978. This cylinder is in all respects identical with the cylinder 260 that operates the blank mold. It has, therefore, a guiding key 979 that properly positions it axially on the block 950, and it has lateral depending flanges 980 that fit over the sides of the overhanging part 242 of the block 950. The key and flanges fully locate the cylinder on the block. It is finally secured to the block by screws 981.

It will be noted that where embracing engagement between parts having relatively large dimension is disclosed, the embracing surfaces are shown to be parallel to the longitudinal dimension of the mating parts. Thus, it is clear that, where heat expansion of the parts has maximum significance, the engagement of the parts enables relative sliding movement therebetween. Notwithstanding the interlocked positional relation between the cylinder 978 and the block 950, for example, these parts may expand differentially in either longitudinal direction from the key 979.

Each piston 977 is attached to a piston rod 976, as shown in Figure 5. The pistons 977 fit over reduced and shouldered portions of the rods 976 and are secured by countersunk nuts 982. The piston rods project inwardly, as shown at 983, through journal bearings 984 in the cylinder heads 985, that are secured to the cylinders 978. These guide rods also reciprocate in caps 986 that are bolted to the cylinder heads 985.

The pistons are operated by valve mechanisms, generally indicated at 990, they being identical with the valve mechanisms for the blank molds that are generally indicated at 270. There is thus a valve housing 991 that engages with the pin 992 that corresponds with the pin 272. Each valve housing is likewise flanged, as shown at 993, on its opposite sides, so as to interfit with the top of an associated cylinder 978. By the flanges 993 and the pins 992, the valve housings may be readily and quickly positioned, after which they may be screwed to the tops of the cylinders by suitable screws 994 (Figure 7).

The housing 991 has a bore 995 therethrough from end to end, in which the valve plug 996 is adapted to reciprocate. This plug is identical with the plug of the blank mold valve. Likewise the valve housing 991 is identical with the valve housing 271. The valve housing 991 is closed by a head or cap member 997, to which an inlet pipe 998 is connected. There are exhaust outlets 999 and 1000 leading therefrom.

The valve plug 996 has an axial bore 1001 extending inwardly from the inlet end thereof and connecting with two radial ports 1002 and 1003. Additionally, the plug has two peripheral exhaust grooves 1004 and 1005.

The valve housing 990 has ports that are adapted to register with the foregoing ports and to continue through the cylinder 978 to opposite ends thereof, as ports 1006 and 1007.

The valve plug may have suitable packing ring grooves, as shown.

The end of the valve plug is bifurcated to receive a cam roller 1011. These parts are identical with the corresponding parts in the other valve. There is also a guide roller 1012 held by a screw 1013, the roller being operable within a slot 1014 in an arm on the housing. This roller thereby guides and limits the movement of the valve.

It will be seen that the introduction of air under pressure into the line 998 acts upon the right end of the valve plug 996 (Figure 5) to urge the valve leftward. This maintains the valve radially inwardly as far as it will go, and holds the cam roller 1011 against the cam track therefor when this cam track moves under the roller.

The cam track for the cam roller 1011 is supported upon the main central column by a collar 1018 (Figure 1), and is shown and described in detail in applicant's aforementioned parent application.

The columns 490 have previously been described as supporting the finish mold ring table 944 (Figure 13). Above the flange of this table 944, there is an extension 1060 on each column. This extension has a flange 1062 at the bottom, which flange engages in the hole that receives the vertical flange 942 on the main column 490. The parts are thereby accurately positioned.

The top of the extension 1060 affords a support for a tie ring 1083, this tie ring being held by screws 1084 to the several composite columns formed by the columns 490 and their extensions 1060. A flanged interfit positions these parts accurately. The tie ring 1083 is guided at its center part upon a flanged bearing member 1085 that rests upon the center column and is keyed thereto by a key 1086. As is evident from the drawings, the tie disc 1083 is provided with spokes that join an inner hub section 1087 and an outer ring 1088. There is a screw 1084 connecting into a column 1060 at the outer end of each of the spokes.

It may be seen from the foregoing description that the rotating mechanism includes the table 190, the wind columns 490 with their extensions 1060, joined by the table ring 944, and the upper disc 1083, which last named disc is journaled to the column. Upon these parts, as a movable framework, the blank mold assemblies are mounted (upon the table 190) and the blow mold assemblies are mounted (on the table ring 944). The cam tracks which control the operation of these assemblies remain stationary on the column 136.

In use, the present invention adds greatly to the flexibility of the depicted bottle forming machine inasmuch as it is necessary to have certain parts of the machine capable of change. For example, molds must be changeable to make ware of different shapes and sizes.

The mold sets, both blank and blow molds, may be withdrawn as units. The screws that hold the blocks 236 to the table 190 are removed, and the air connections released, whereupon any blank mold may be withdrawn as a unit including its power cylinder and valve. Any blow mold unit may likewise be withdrawn. As the blocks 236 are all identical, this makes possible the quick removal of any mold and the substitution of another one. The several blank mold units are all interchangeable, as are the blow mold units. In replacing one unit with another, complete and accurate alignment is obtained by the engagement of the mold pin in a hole 209 or 963, and the saddling of a block in a yoke 252 or a notch 960. Thereafter, these screws are tightened merely as holding means. No drive pins or the like are required. These positioning elements are sufficiently removed from the highly heated parts to be unaffected by expansion.

A blank mold may be removed from its pin 245 by disconnection of the links 259, and the lifting of the mold sections from the pin 245. Thereafter, a different mold may be installed over the pin 245 and properly connected to the yoke. Conventionally, all molds have hinge ears of the same size and shape. The changing of a blow mold follows a like procedure.

In the installation of molds into this machine, one of the controlling factors is the proper seating of a transfer head into the blank and the blow mold. It is achieved by vertical adjustment of the individual molds. In the case of a blank mold, the ring 248 surrounding the collar 247 is loosened. The collar 247 is then turned to raise or lower the mold to secure precise seating of the transfer head in the top of the blank mold, after which the ring 248 is again tightened. This adjustment is accommodated for by lost motion vertically in the hinges of the mold to the yoke 258. The blow mold may be similarly adjusted vertically by the collars 970 to fit properly with the transfer head.

From the foregoing it may be seen that this invention provides for faster production of better ware, with less complication than heretofore. It accomplishes its objectives previously set forth.

What is claimed is:

1. In a glass machine of the type having a plurality of blank and finish molds supported on a common base and an individual cylinder for each mold, the combination of an individual block for removably mounting each associated mold and cylinder, said blocks being identical for free interchange between molds and cylinders, means including a mold hinge pin accurately located and secured in each of said block for accurately locating an associated mold thereon, and means including accurately located interlockingly engageable surfaces on each block and each cylinder extending in at least two mutually perpendicular directions for accurately locating and aligning the cylinders on their associated blocks in predetermined relation to the respectively associated molds.

2. The combination of claim 1 wherein the rotatable base is provided with one set of accurately located surfaces for accurately locating each associated mold, cylinder, and block unit at predetermined radial distances from the upstanding column and in desired spaced array, and wherein the rotatable base is provided with another set of accurately located surfaces for accurately aligning each associated mold, cylinder, and block unit in predetermined relation to a radial line emanating from said column.

3. The combination of claim 2 with an individual valve mounted directly on each cylinder, each valve being identical for free interchange between cylinders, and means including accurately located interlockingly engageable surfaces on each valve and each cylinder extending in at least two mutually perpendicular directions for accurately locating and aligning the valves on their associated cylinders and in predetermined relation to the upstanding column.

4. The combination of claim 3 wherein each mold hinge pin extends beyond its associated block for interlockingly engaging one of said accurately located surfaces for accurately locating the several molds, cylinders, and block units, and wherein each block is provided with accurately located gauge-like surfaces for aligning engagement with said accurately located surfaces provided in the base for accurately aligning each associated mold, cylinder, and block unit, said aligning engagement being slidable for accommodation of expansion of the block due to heat absorption or the like.

5. The combination of claim 4 wherein the means for accurately locating and aligning the cylinders on their associated blocks and the means for accurately locating and aligning the valves on their associated cylinders each comprises a key member disposed centrally of the associated cylinder and extending in a transverse direction in respect to the gauge-like surfaces of the associated block, and wherein said means further comprises depending flanges on the cylinder for embracing engagement with the block and depending flanges on the valve for embracing engagement with the cylinder, each of said conditions of embracing engagement being such as slidably to accommodate expansive movement of the mating parts due to absorption of heat or the like.

6. In a glass machine of the type having a plurality of blank and finish molds supported on a common base and an individual cylinder for each mold, the combination of an individual block for removably mounting each associated mold and cylinder, said blocks being identical and each having a mold hinge pin secured therein and extending therebeyond, said base being provided with accurately located holes for receiving one end of each hinge pin for accurately locating each blank mold, cylinder, and block unit in predetermined relation to a corresponding finish mold, cylinder and block unit whereby any of the units may be freely interchanged with a like unit and whereby, upon removal of the molds only, the remaining portion of any unit may be freely interchanged with the remaining portion of any other unit.

7. The combination of claim 6 wherein each mold hinge pin is provided with a screw collar for vertical adjustment of a mold thereon whereby, upon interchange of said remaining portion of a unit with the said remaining portion of an unlike unit, the removed molds may be replaced on the interchanged units and adjusted to their appropriate respective elevations on the base.

8. In a glass machine of the type having equal pluralities of replaceable blank molds and finish molds supported on a common rotatable base and adapted to revolve about a central upstanding column mounting a stationary cam for sequentially controlling the opening and closing of the blank molds and a stationary cam for sequentially controlling the opening and closing of the finish molds, the combination of means on said base for removably supporting said plurality of blank molds in equally spaced circular array about said column at one elevation on said base, means for removably supporting said plurality of finish molds in equally spaced circular array about said column at another elevation on said base, an individual fluid operated cylinder for operating each blank and finish mold, said cylinders being identical one with another for free interchange between said blank and finish molds, an identical means for mounting each of said cylinders radially inwardly of its associated mold, including identical interlocking locating means to locate each cylinder with its longitudinal axis in predetermined relation along and transversely to a radial line emanating from said column, and means to secure the cylinders in the positions so determined by the locating means.

References Cited in the file of this patent

UNITED STATES PATENTS

| | | |
|---|---|---|
| 791,410 | Fetters | May 30, 1905 |
| 806,669 | Hill | Dec. 5, 1905 |
| 869,538 | Winder | Oct. 29, 1907 |
| 1,072,553 | Winder | Sept. 9, 1913 |
| 1,353,986 | Bergendorf | Sept. 28, 1920 |
| 1,385,428 | Cox | July 26, 1921 |
| 1,458,454 | Young | June 12, 1923 |
| 1,868,248 | Parham | July 19, 1932 |
| 1,869,249 | Gray et al. | July 26, 1932 |
| 2,011,187 | Rowe | Aug. 13, 1935 |
| 2,018,021 | Hofman | Oct. 22, 1935 |
| 2,069,130 | Bridges | Jan. 26, 1937 |
| 2,205,261 | Winder | June 18, 1940 |
| 2,362,427 | Allen | Nov. 7, 1944 |
| 2,376,928 | McNish | May 29, 1945 |
| 2,388,876 | Smith | Nov. 13, 1945 |

FOREIGN PATENTS

| | | |
|---|---|---|
| 164,254 | Great Britain | June 9, 1921 |